March 28, 1944.　　　W. MARTIN　　　2,345,408
BEETLE TRAP
Filed Aug. 16, 1943
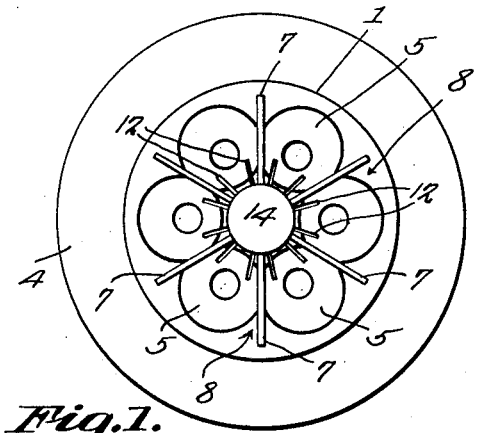
Fig.1.
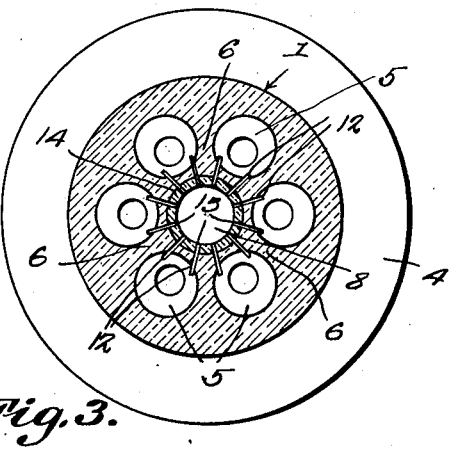
Fig.3.
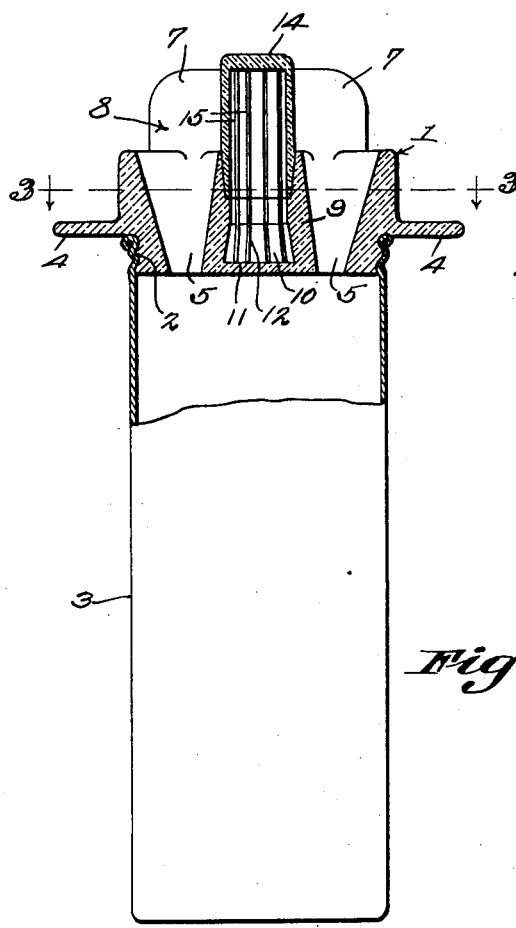
Fig.2.
Fig.4.
William Martin
INVENTOR.
BY CA Knowles.
ATTORNEYS.

Patented Mar. 28, 1944

2,345,408

UNITED STATES PATENT OFFICE 2,345,408

BEETLE TRAP

William Martin, Providence, R. I.

Application August 16, 1943, Serial No. 498,797

5 Claims. (Cl. 43—107)

This invention aims to provide a novel head which is capable of being mounted on a specially constructed, imprisoning receptacle, or upon convenient receptacles of different sizes, the device being effective to entrap insects, beetles and the like, especially Japanese beetles.

The invention aims to provide novel means whereby the structure claimed may be assembled readily with a receptacle, to provide novel means for holding bait and for rendering the odor thereof attractively available to the beetles or the like which are to be trapped, and to provide novel means for directing the beetles to and through openings which lead downwardly to the imprisoning receptacle.

Another object of the invention is to make use of transparent or translucent material, of a yellow color, such material having been found to be effective in attracting Japanese beetles.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows, in top plan, a device constructed in accordance with the invention;

Fig. 2 is a vertical, longitudinal section, wherein parts remain in elevation;

Fig. 3 is a transverse section on the line 3—3 of Fig. 2;

Fig. 4 is a section like the one depicted in Fig. 2, but showing a modification.

In carrying out the invention, there is provided a head 1, preferably but not necessarily made of transparent or translucent yellow material, such as glass or a plastic, it having been found that material of those characteristics will attract insects and beetles, especially Japanese beetles.

The head 1 is externally threaded, as shown at 2, so that it may be assembled readily with the upper end of a receptacle 3. At the upper end of the thread 2, the head 1 is supplied with an outstanding, circumscribing flange 4. The flange 4 is adapted to rest on the upper end of a receptacle (not shown) having a greater diameter than the receptacle 3, the flange contituting a support, which enables the device to be used upon any convenient receptacle, within reasonable limits.

The head 1 is supplied with downwardly tapered openings 5 extended therethrough, and preferably arranged in a circle. The openings 5 are spaced apart circumferentially, leaving walls 6 between the openings.

Upstanding, radial wings 7 are formed integrally with the walls 6, and each pair of adjoining wings form a compartment 8, disposed above one of the openings 5. An insect, having entered any of the compartments 8, will be prevented by the wings 7 from moving circumferentially of the head 1, and will be likely to pass downwardly into the receptacle 3, through the corresponding opening 5.

The head 1 includes a central hub 9, in which is formed a chamber 10. In the form shown in Figs. 1, 2 and 3, the chamber 10 is closed at its lower end, as indicated at 11, although, as will be made manifest hereinafter, the fixed closure depicted at 11 may be dispensed with.

The hub 9 is supplied with openings in the form of narrow, vertical slits 12, establishing communication between the chamber 10 and the openings 5.

At 14 there appears an inverted, cup-shaped bait case, seated removably in the upper portion of the chamber 10, the bait case being provided with longitudinal slits 15, matching with the slits 12 of the hub 9. The construction is such that the odor of the bait in the bait case 14 and in the chamber 10 can find its way outwardly into the openings 5 of the head 1 and into the compartments between the wings 7.

Bait is placed in the case 14, the case having been removed and inverted from the position of Fig. 2. The case 14 then is inverted again, and mounted as shown in Fig. 2, the bait finding lodgement in the case 14 and in the chamber 10. The odor of the bait passes outwardly through the slits 12 and 15, into the openings 5 and into the compartments 8. The insects, attracted by the odor of the bait, travel or fall downwardly, through the openings 5, into the receptacle 3.

In Fig. 4, parts hereinbefore described have been designated by numerals already used, with the suffix a.

In this form of the invention, the bait case 14a is formed integrally with the hub 9a. The chamber 10a is open at its lower end, but is closed by a removable stopper 16. Bait is placed in the bait case 14a and in the chamber 10a by removing the head 1a from the receptacle 3a and inverting the head, the stopper 16 being removed, and being replaced after the bait has been located in the case and in the chamber.

What is claimed is:

1. A trap for beetles and the like, comprising a head having openings therethrough, the openings forming a central hub having a chamber, there being walls between the openings, an inverted cup-shaped bait case carried by the hub and communicating with the chamber, upright wings on the walls and forming compartments individual to the openings; the hub having apertures establishing communication between the chamber and the openings, the case having apertures establishing communication between the inside of the case and the compartments, and a closure for the lower end of the chamber.

2. A trap for beetles and the like, constructed as set forth in claim 1, and wherein the closure is an integral part of the hub, the case being removably mounted on the hub.

3. A trap for beetles and the like, constructed as set forth in claim 1, and wherein the case is an integral part of the hub, the closure being a removable stopper.

4. A trap for beetles and the like, constructed as set forth in claim 1, and wherein the apertures of the hub and of the case are narrow, upright slits, the slits of the hub communicating at their upper ends with the lower ends of the slits of the case.

5. A trap for beetles and the like, constructed as set forth in claim 1, and wherein the head is made of yellow-colored material typically represented by glass.

WILLIAM MARTIN.